United States Patent Office 3,222,297
Patented Dec. 7, 1965

3,222,297
AGGLOMERATION OF BAUXITE FINES
Aldo P. Allegrini, Westfield, and Tom A. Cecil, Highland Park, N.J., assignors to Mineral & Chemicals Philipp Corporation, Menlo Park, N.J., a corporation of Maryland
No Drawing. Filed July 12, 1962, Ser. No. 209,320
9 Claims. (Cl. 252—437)

This invention relates to the binding of bauxite fines into hard coherent agglomerates.

Bauxite is a naturally occurring alumina ore, the granular grades of which are used chiefly as adsorbents, catalysts and desiccants. To obtain these granular grades from the raw ore, the ore is first partially dried to a volatile matter (V.M.) content of about 30%, then crushed and screened and, finally, activated by heating at a temperature between about 600° F. and about 1200° F. so as to leave from 1% to 12% V.M. in the products. The granular grades of bauxite ore are classified as to screen fraction, and range in particles dimension from relatively coarse products, such as those of mesh sizes 2/4, 4/8 and 4/10, down to granules which may be as fine as 20/60 mesh.

While activated granules obtained by crushing of whole bauxite ore possess sufficient hardness or attrition resistance for many applications, the granules are too soft to permit their use under conditions in which the granules are subjected to severe attrition. By way of example, activated bauxite granules obtained by crushing and screening the whole ore have been found to be considerably too soft for use as supports for catalytically active metal oxides employed in the purification of automotive exhaust. During such service, bauxite supported catalyst granules disintegrate rapidly into fine particles which are discharged from the exhaust purification chamber into the atmosphere.

Many attempts have been made in the past to agglomerate bauxite fines into hard granules, without adversely effecting the natural characteristics of the bauxite. A great variety of so-called "binders" has been tried, including clays, organic and inorgnic silicates, acids, organic salts and inorganic salts. Most of these attempts have not been completely successful in that the agglomerates proved to be unsuccessful in catalytic or adsorptive properties or they were too soft. Some of the suggested binding solutions resulted in the incorporation with the bauxite of fluxing metals, e.g., calcium or sodium, which rendered the granules unsuitable for some uses in which the granules are subjected to elevated temperature, e.g., as a catalyst support in the purification of engine exhaust. While certain binding solutions, such as the phosphoric acid solutions of the prior art, can lead to the formation of granulated bauxite fines which are as hard as, or harder than, bauxite granules obtained from the whole ore, the hardness of such granules, especially their resistance of attrition, leaves much to be desired.

It has recently been found the absorptive particles of noteworthy hardness can be obtained by agglomerating bauxite fines with the combination of a sulfuric acid and phosphoric acids as the binding agent. The process is carried out by mixing the fines with a mixture of the acids in amount sufficient to form a mix having a consistency suitable for agglomeration. The mix is then agglomerated, as by extrusion. Employing concentrated mixed acid solutions which lead to the production of extruded agglomerates of optimum hardness, care must be exercised to prevent the bauxite-mixed acid composition from setting up during mixing or before the particle forming step is completed. The agglomerates are then aged to complete reaction between the bauxite and the acids and then, without leaching the aged agglomerates to remove aluminum phosphate and aluminum sulfate reaction products, the agglomerates are calcined at a temperature and for a time sufficient to eliminate completely sulfate therefrom in the form of volatile sulfur-containing gases. The particles produced with the combined acids as the binding agent are considerably harder than agglomerates obtained with either acid used singly. However, in attempting to utilize agglomerates produced with the mixed acids as support for impregnated catalysts, it has been found that the initial attrition-resistance of the particles tends to diminish appreciably after the particles have been treated with metallic salt solutions and then calcined to form supported catalysts. Moreover, the catalyst particles produced with the agglomerates as the support undergo a further considerable decrease in attrition resistance when they are subjected to elevated temperature during service. By way of illustration, extruded bauxite pellets obtained by binding bauxite fines with a concentrated mixture of sulfuric acid and phosphoric acid suffered a 40% loss in attrition-resistance (as determined by the 4-ball hardness test described hereinafter) after the pellets had been impregnated with a copper nitrate solution and calcined to produce a supported CuO oxidation catalyst. The catalyst pellets underwent an additional hardness loss of 35% after they had been maintained at an elevated temperature that was well below the sintering temperature of the catalyst.

Accordingly, a principal object of this invention is to produce superior bauxite agglomerates with mixed phosphoric acid-sulfuric acid solutions.

A further object is the provision of an improved method for agglomerating bauxite fines with mixed sulfuric and phosphoric acids which results in exceptionally hard agglomerates which substantially maintain their resistance to attrition after being impregnated with catalytic material and then subjected to heat.

A further object of this invention is to avoid premature hardening of plastic masses composed of bauxite fines and a concentrated mixture of sulfuric acid and phosphoric acid, thereby obviating former difficulties in agglomerating bauxite fines into shaped particles using the mixture of acids as the binding solution.

Further objects and advantages of this invention will be readily apparent from the description thereof which follows.

This invention stems from the discovery that in a process for binding bauxite fines with a mixture of phosphoric and sulfuric acids, remarkable results, in terms of permanency of agglomerate hardness, are realized by controlling the concentration and relative ratio of acids employed in the process. Further, it has been found that when the desired acid ratio is utilized, superior results are obtained by employing bauxite fines which have been previously calcined to a V.M. content that is far lower than the V.M. of bauxite fines employed in prior art bauxite agglomerating processes.

Stated briefly, in accordance with this invention, bauxite fines are mixed with a sufficient quantity of a mixture of sulfuric acid and phosphoric acid to permit agglomeration of the mixture, said acid mixture being of 90% to 100% total acid concentration and containing from about 1½ to about 3½, and preferably from 2 to 3, parts by weight of $H_2SO_4$ to 1 part by weight of $H_3PO_4$. The mixture is formed into agglomerates of the desired shape and size and then aged at a temperature and for a time sufficient to complete reaction between the bauxite fines and the acids. Without washing the agglomerates, they are calcined at a temperature and for a time sufficient to remove sulfate completely therefrom.

In accordance with a form of this invention, the bauxite fines that are used as a starting material have been calcined at a temperature below 1600° F., preferably below 1500° F., for a time sufficient to render them substantially anhydrous. Agglomerates produced in a rotating disc pelletizer by spraying the mixed acid solution on the bauxite fines are significantly harder when the bauxite has been calcined in this manner. When agglomerates are formed by extrusion, it has been found, unexpectedly, that the premature hardening of masses composed of bauxite fines and concentrated mixture of sulfuric acid and phosphoric acid which would make extrusion of the mix into smooth uniformly sized pellets difficult, if not impossible, is obviated if the bauxite fines employed as a starting material in the process have previously been calcined at a temperature below about 1600° F. and for a time sufficient to render them substantially anhydrous without sintering the bauxite. In other words, the preferred bauxite fines employed in forming agglomerates by extrusion are those that have been calcined to a volatile matter content below 1% at a temperature below which their natural adsorptivity is not impaired to any great extent.

Bauxite agglomerates produced in accordance with this invention with a concentrated acid mixture containing about 1½ to about 3½ parts of $H_2SO_4$ to 1 part of $H_3PO_4$ are appreciably more resistant to attrition than either activated bauxite granules obtained from whole ore or bauxite agglomerates that have been obtained with phosphoric acid or sulfuric acid, each used singly. The agglomerates made in accordance with this invention, especially the agglomerates made up with 2 parts of $H_2SO_4$ to 1 part of $H_3PO_4$ are usually somewhat harder than agglomerates obtained with $H_2SO_4/H_3PO_4$ ratios outside the range of those utilized in carrying out this invention. The former agglomerates, however, will maintain substantially their hardness and also possess heat stability after they have been impregnated with metal salt solutions to produce supported metal oxide catalysts. In contrast, agglomerates made with either higher or lower ratios of $H_2SO_4$ to $H_3PO_4$ soften after being impregnated and heat treated to produce supported metal oxide catalysts and the supported catalysts obtained in this manner have poor thermal stability.

The bauxite fines employed in carrying out this invention may be obtained as a by-product in the crushing and screening of bauxite ore to produce granular grades of the ore or they may be produced by intentionally crushing the ore, or granular grades of the ore to about 100% minus 60 mesh. The bauxite, before crushing, or after crushing, is calcined to a V.M. of about 10% or below at a temperature within the range of about 600° F. to about 1600° F. As mentioned, when agglomeration of the fines is to be carried out in extrusion equipment, the fines are preferably calcined to a V.M. below 1% before being plasticized for extrusion with the mixture of acids. To produce the preferred bauxite fines having a V.M. less than 1% without substantially impairing the surface area of the fines, calcination is carried out at a temperature within the range of about 1300° F. to about 1600° F. (product temperature) and preferably at a temperature within the range of 1350° F. to 1450° F. At calcination temperatures appreciably below 1350° F., difficulty may be experienced in reducing the V.M. to the desired level. At calcination temperatures above 1450° F., the bauxite may undergo an undesirable loss of surface area, thereby impairing the utility of the ultimate agglomerates as adsorbents or as carriers for catalytically active material. Especially good results have been obtained by carrying out the calcination of the starting bauxite fines at 1400° F. The V.M. of the preferred calcined fines is typically within the range of ½% to ¾%, although the bauxite fines that have been calcined to somewhat lower or a somewhat higher V.M. can be used.

Total acid dosage will vary with the agglomeration technique employed and will generally be within the range of about 70% to 100%, acid dosage being the parts by weight of 100% acid to parts by weight of volatile free (V.F.) bauxite, expressed on a precentage basis. Using the preferred extrusion technique, acid dosage will fall within the limits of about 80% to 90%, corresponding to about 1 cc. of mixed acid solution to about 2.0 to 2.5 grams of volatile free (V.F.) bauxite fines.

The mixing of bauxite fines and mixed acid solution to form a uniform mass of a consistency amenable to agglomeration can be carried out in any type of apparatus available for this sort of operation, as for example, a pug mill, a kneader or a muller mixer. Agglomerates can be drum-formed spheres, briquets, pills, extruded pellets, etc. They can be made in the shape and size desired for usage as such or they can be made in any shape and size and eventually crushed to granular grade sizes.

As mentioned, the preferred method for agglomerating the mix is by extrusion. In carrying out this form of the invention, about one-third to about one-half of the charge of bauxite fines (previously calcined to a V.M. below 1% at a temperature not to exceed about 1600° F.) is initially slurried in a concentrated solution of mixed acids and additional calcined bauxite fines incorporated into the slurry to provide a uniform plastic extrudable mass. The temperature of the mass should be controlled by using precooled acid solution and practicing gradual addition of ingredients, so that mass temperature does not exceed about 100–150° F. during mixing. This technique, carried out in conjunction with the use of substantially anhydrious bauxite fines, will prevent the premature hardening of the fines into a solid coherent mass which would normally occur when the mixed acid solution is added to the entire charge of bauxite fines. The mass is extruded through a multi-orificed die plate to form strands which are cut into pellets of suitable size as they issue for the die plate. By employing substantially anhydrous bauxite fines in the process, the acid plasticized bauxite can be extruded into smooth uniform pellets. A conventional screw-type extruder can be employed. The pellets can be from about 1/16" to 3/8" in diameter and about ¼" to 1" long, although pellets of other dimensions can be produced if desired.

The green pellets or agglomerates are then aged out of direct contact with an external aqueous phase, so as to prevent leaching of aluminum salt reaction products, at a temperature and for a time sufficient to complete reaction between the acids and the aluminum in the bauxite. To accelerate reaction, the pellets are heated at an oven temperature of about 200° F. to about 400° F. Pellet temperature rises to 400° F. or above after reaction is initiated. Aging may be carried out in the presence of air although the pellets can be aged in direct contact with an inert oil, such as mineral oil, which is eliminated from the agglomerates during calcination. Aging time, which will vary considerably with the temperature employed in the aging operation and with the efficiency of heat transfer in the aging equipment, is usually within the range of about ½ hour to 24 hours.

Calcination of the aged particles can be carried out at temperatures within the range of about 900° F. to about 1800° F., depending upon the atmosphere in which calcination is conducted. When calcination is carried out in a reducing atmosphere (i.e., in the presence of CO and $H_2$ obtained, for example, by burning fuel with a deficiency of oxygen) complete desulfation of the aluminum sulfate reaction product can be realized at a temperature appreciably lower than the normal decomposition temperature of aluminum sulfate (1432° F.). At calcination temperatures in excess of about 1800° F. undesirable sintering and loss of surface area of the product may occur. Calcination removes residual combined water from the bauxite together with sulfur containing gases which are volatilized and removed from the bonded bauxite agglomerates. Calcination should be carried out for a time sufficient to reduce the V.M. of the agglomerates to an amount within the limits of amout 1% to 12% in order to produce agglomerates of optimum absorbency.

However, for some applications, it may be desirable to calcine the agglomerates to somewhat lower or to somewhat higher V.M. levels.

Following are descriptions of examples of practicing a preferred embodiment of my invention which will serve to illustrate the usefulness of the invention.

The results of these examples will show that acid bonded extruded pellets made as herein disclosed are vastly superior in attrition resistance to: (1) granular bauxite from the same ore source, (2) acid bonded extruded pellets made with sulfuric acid alone, (3) acid bonded extruded pellets made with phosphoric acid alone, (4) mixed acid bonded extruded pellets obtained with ratios of sulfuric acid and phosphoric acid outside the scope of this invention.

The results of these examples will show also that bauxite pellets that have been made in accordance with this invention, with a controlled ratio of $H_2SO_4$ to $H_3PO_4$, maintain their hardness under conditions which cause pellets outside the scope of this invention to undergo physical breakdown.

In the examples all hardness measurements were made by the so-called "4-ball" hardness test, a test widely used to measure the resistance of granular catalyst particles to physical breakdown or attrition under conditions of very strong attritive forces. In carrying out the hardness tests, screened test sample is poured into a tared 100 cc. graduate cylinder to the 80 cc. mark, with gentle tapping to pack the particles and the weight of 80 cc. of the sample is determined. 80 cc. of sample is placed in a stainless steel cylindrical container with four polished stainless steel ball bearings, each of $15/16$ inch diameter. The container is closed tightly and it is then rotated about its longitudinal axis on a roller arrangement at about 80 r.p.m. for one hour. After rotation had ceased, the particles in the container are screened on a limiting sieve (e.g., 8 mesh or 10 mesh) and the hardness calculated as the precentage of total sample weight represented by the fraction of the material retained on the limiting sieve.

EXAMPLE I

Experiments were carried out to show the superiority of unimpregnated adsorbent bauxite pellets obtained by extruding bauxite fines with a 2/1 or 3/1 weight ratio of $H_2SO_4$ to $H_3PO_4$ over most bauxite fines pelletized with higher or lower ratios of $H_2SO_4$ to $H_3PO_4$.

Minus 60 mesh Demerara bauxite ore was calcined in a muffle furnace at a bed temperature of 1400° F. to a V.M. below 1%. Portions of the calcined bauxite fines were thoroughly mixed with various mixtures of $H_2SO_4$ and $H_3PO_4$ of about 92% to about 99% total acid concentration. The acid dosages that could be used were controlled by the concentration of the acids and the $H_2SO_4/H_3PO_4$ ratio. For a predetermined acid concentration and/or $H_2SO_4/H_3PO_4$ ratio, the quantity of ore that could be used was limited by the necessity for producing a mix of extrudable consistency.

In mixing the calcined fines with the mixture of acids, the fines were initially slowly added to an acid mixture that had previously been cooled below 80° F. until the slurry was still flowable. About 1/3 to 1/2 of the total bauxite charged was used. During the bauxite addition the slurry was agitated with a mechanical stirrer and maintained at a temperature below 100° F. After further cooling to 80° F. the bauxite-acid slurry was transferred to a pug mill. Additional ore was charged to the slurry in the pug mill until an extrudable mix was obtained. The total residence time of the charge in the pug mill varied from 2 to 4 minutes.

Each extruder charge was extruded in a screw-type extruder through a multi-orificed plate to produce rods 0.101" or 0.128" diameter which were cut into pellets about 3/8" long as they issued from the die plate. The dusted pellets were sifted over a 4 mesh screen and all oversize pellets were recycled to the extruder. The minus 4 mesh extruded pellets were placed in an oven for 1½ to 4 hours at an oven temperature of 250° F.–300° F. During this period, the bauxite reacted with the pellets and pellet temperature increased to 400° F.–430° F. The aged pellets were sifted over a 12 mesh (Tyler) screen to remove bauxite dusting powder. The pellets were then desulfated by maintaining them in a muffle furnace (1530° F.) for at least 6 hours until sulfate free. Pellet V.M. was within the range of 3 to 4%.

The 4-ball hardness values of extruded pellets produced with various ratios of $H_2SO_4$ to $H_3PO_4$ are summarized in Table I along with the hardness value of commercial activated bauxite granules (control) from the whole ore. The data in Table I show that all pellets produced by binding fines with mixtures of $H_2SO_4$ and $H_3PO_4$ were appreciably harder than the control granules. However, of the fines pelletized with mixtures of $H_2SO_4$ and $H_3PO_4$, the pellets obtained with a 2/1 ratio of $H_2SO_4$ to $H_3PO_4$ were somewhat harder than pellets obtained with higher $H_2SO_4$ to $H_3PO_4$ ratios up to 5/1 and appreciably higher than pellets produced with $H_2SO_4$ to $H_3PO_4$ ratios above 5/1 or below 2/1.

Table I

EFFECT OF RATIO OF $H_2SO_4$ TO $H_3PO_4$ ON THE HARDNESS OF EXTRUDED BAUXITE ADSORBENT PELLETS

| Composition, Parts/100 Parts V.F. Bauxite | | | Total Acid Concentration, Percent | Approximate Weight Ratio $H_2SO_4$ to $H_3PO_4$ | Gram V.F. ore/cc. Acid Solution | Particle Shape | Particle Size | Percent Hardness (of +10 mesh fraction) |
|---|---|---|---|---|---|---|---|---|
| $H_2SO_4$ | $H_3PO_4$ | $H_2O$ | | | | | | |
| Control (activated bauxite granules—whole ore crushed and calcined @ 700° F. to 10% V.M.). | | | | | | Granules | 6/8 mesh | [1] 5 |
| 82.4 | 8.2 | 4.9 | 95.1 | 10/1 | 1.9 | Pellets | 0.101" | 70 |
| 70.0 | 13.9 | 3.0 | 96.6 | 5/1 | 2.1 | do | 0.128" | 89 |
| 70.0 | 16.8 | 2.9 | 96.8 | 4/1 | 2.1 | do | 0.101" | 72 |
| 70.0 | 16.8 | 2.9 | 96.8 | 4/1 | 2.1 | do | 0.128" | 86 |
| 62.0 | 20.6 | 6.2 | 93.2 | 3/1 | 2.0 | do | 0.101" | 85 |
| 62.0 | 20.6 | 6.2 | 93.2 | 3/1 | 2.0 | do | 0.128" | 90 |
| 56.1 | 27.4 | 7.5 | 92.5 | 2/1 | 2.0 | do | 0.128" | 91 |
| 58.6 | 28.0 | 1.1 | 98.6 | 2/1 | 2.1 | do | 0.128" | 93 |
| 56.0 | 27.5 | 7.5 | 92.5 | 2/1 | 2.0 | do | 0.128" | 90 |
| 44.5 | 45.5 | 1.1 | 99.0 | 1/1 | 2.0 | do | 0.128" | 85 |

[1] Hardness of +8 mesh fraction.

EXAMPLE II

Experiments were carried out to determine whether $H_3PO_4$ or $H_2SO_4$, employed singly, could bind bauxite fines in pellets having the attrition resistance of fines pelleted with the combination of acids.

Attempts were made to extrude bauxite fines with concentrated sulfuric acid solutions of 40% to 96% concentration in order to form pelleted bauxite fines with acid dosages comparable to those used in Example I with mixed acid solutions. These efforts were unsuccessful in that the mixes tended to agglomerate in the pugger and masses of extrudable consistency could not be obtained, even by adding water after addition of acid. Agglomerates obtained directly in the pugger were screened, aged and calcined as in Example I. All of the calcined agglomerates were found to be too soft to permit their evaluation by the 4-ball hardness test. It was found that the fines could be made up into an extrudable mass by using $H_2SO_4$ solutions more dilute than 40%, with a $H_2SO_4$ solution of 25% concentration being optimum. An extrudate was obtained from a mixture of bauxite fines with a 6.2% dosage of $H_2SO_4$ (6.2 parts of 100% $H_2SO_4$/100 parts V.F. ore) in the form of a 25% aqueous acid solution. These pellets were aged and calcined as in Part A. The 4-ball hardness of the plus 10 mesh fraction of pellets obtained with $H_2SO_4$ without $H_3PO_4$ was only 40% as compared with the plus 10 mesh fractions of pellets produced in accordance with this invention which had 4-ball hardness values of 85% to 93%.

Pellets obtained by pugging the bauxite fines ore with $H_3PO_4$ acid solution in the absence of $H_2SO_4$, extruding, aging and calcining at 700° F. or 1100° F. were found to be even less resistant to attrition than the best pellets obtained with the $H_2SO_4$ alone.

EXAMPLE III

Supported CuO catalysts were made up by impregnating samples of some of the pellets obtained in Example I with aqueous copper nitrate solution, followed by calcination of the impregnated pellets in a muffle furnace at a bed temperature of 900° F. for 1 hour. The hardness of the catalyst pellets was measured (1) after preparation and (2) after being heat treated, with the results summarized in Table II. For purposes of comparison, the properties of the hardest extruded pellet obtained by pelletizing the fines with $H_2SO_4$ alone (6.2% dosage of $H_2SO_4$ of 25% concentration) were measured before impregnation with catalyst, as well as after thermal treatment of the impregnated catalyst.

being impregnated with catalyst, pellets made in accordance with this invention with 2/1 and 3/1 ratios of $H_2SO_4$ to $H_3PO_4$ actually improved in hardness after impregnation with catalyst. Data in Table II also show that only the catalysts made from pellets prepared with 2/1 and 3/1 ratios of $H_2SO_4$ to $H_3PO_4$ were almost as attrition resistant after heat treatment as they were before heat treatment. Therefore, these data show that only the catalysts supported on pellets produced in accordance with this invention had good thermal stability.

EXAMPLE IV

In accordance with this invention, substantially spherical active alumina pellets (6/8 mesh) were produced by calcining ground Surinam bauxite ore to a V.M. below 1% and pelletizing the calcined bauxite fines on an inclined rotating pelletizing disc (Dravo Pelletizing Disc). The calcined fines were continuously charged to the disc and while the disc was rotating, the fines were sprayed with a mixture of 98% sulfuric acid and 85% phosphoric acid containing 2 parts by weight of $H_2SO_4$ to 1 part by weight of $H_3PO_4$. In various runs, the acid dosage ranged from 87 to 107 parts by weight of combined $H_2SO_4$ and $H_3PO_4$ to 100 parts by weight of V.F. bauxite fines. The green spheres were aged in a rotary kiln at 260° F. to 300° F. for 3 hours and then desulfated in a directly fired rotary kiln at 1300° F. to 1400° F. in a reduced atmosphere for 4 to 6 hours. The calcined pellets from the various runs had 4-ball hardness values of 93% to 97%.

When bauxite fines calcined to a V.M. of 6% to 8% were substituted for the fines calcined to a V.M. below 1% and agglomerated in the pelletizing disc with the mixed 2/1 acid solution, the calcined product appeared to be somewhat softer than agglomerates made with fines calcined to a V.M. of 1%.

The term "volatile matter" or V.M." as used herein refers to the weight percentage of a material eliminated

*Table II*

EFFECT OF RATIO OF $H_2SO_4$ TO $H_3PO_4$ USED IN PELLETIZING BAUXITE FINES ON THE HARDNESS OF CuO CATALYST SUPPORTED ON THE BAUXITE PELLETS

| Carrier | Bauxite Fines Pelletized With $H_2SO_4$ | Bauxite Fines Pelletized With Mixtures of $H_2SO_4$ and $H_3PO_4$ | | | |
|---|---|---|---|---|---|
| Composition of binding solution $H_2SO_4$:$H_3PO_4$ wt. ratio | 1/0 | 5/1 | 4/1 | 3/1 | 2/1 |
| Hardness, percent— | | | | | |
| +8 mesh | 28 | 88 | 62 | 73 | 84 |
| +10 mesh | 40 | 89 | 72 | 85 | 90 |
| 10% CuO supported catalyst: | | | | | |
| Hardness, percent— | | | | | |
| +8 mesh | 35 | 51 | 44 | 81 | 87 |
| +10 mesh | 48 | 58 | 60 | 90 | 93 |
| 10% CuO supported catalyst after heat treatment at | 1,500° F./5 hrs. | 1,650° F./5 hrs. | | 1,650° F./5 hrs. | |
| Hardness, percent— | | | | | |
| +8 mesh | 10 | 33 | | 81 | 84 |
| +10 mesh | | 40 | | 88 | 85 |

It was shown in Example II that the attrition resistance of pelleted catalyst carrier obtained with $H_2SO_4$ in the absence of $H_3PO_4$ was poor as compared with the attrition resistance of pellets produced using mixed sulfuric acid and phosphoric acid. Data in Table II show that the thermal stability of the catalyst supported on bauxite that had been pelletized with sulfuric acid alone was very poor. While the carrier prepared with a 5/1 $H_2SO_4$:$H_3PO_4$ ratio was as good as the carrier made with a 3/1 acid ratio and only somewhat inferior to the carrier prepared with a 2/1 $H_2SO_4$:$H_3PO_4$ ratio, the hardness of the carrier made with the 5/1 acid ratio was destroyed by impregnation with catalyst to such an extent that the catalyst supported on this carrier was not much harder than the catalyst pellets based on a carrier made up with sulfuric acid alone. Pellets made up with a 4/1 acid ratio also underwent a substantial loss of hardness upon impregnation. In contrast with the loss of hardness of other carriers upon by heating the material to essentially constant weight at 1800° F. In the case of bauxite ore, water accounts for substantially all of the volatile matter. All mesh size values refer to measurements made with Tyler screen size sieves.

We claim:

1. A method for agglomerating bauxite fines which comprises:

mixing bauxite fines which have been calcined at a temperature within the range of about 600° F. to about 1600° F. to a volatile matter content below 10% with a sufficient quantity of a mixture of sulfuric acid and phosphoric acid to permit agglomeration of said fines, said mixture of acids being of 90% to 100% concentration and containing from about 1½ to about 3½ parts by weight of $H_2SO_4$ to 1 part by weight of $H_3PO_4$, forming the mixture into agglomerates, heating said agglomerates at a temperature within the range of about 200° to about 400° F. for a time sufficient for said acids to react substantially completely with aluminum in said bauxite fines and, without washing them, calcining the aged agglomerates at a temperature within the range of about 900° F. to about 1800° F. for a time sufficient to eliminate sulfate substantially completely therefrom.

2. The method of claim 1 in which said mixture of acids contains from 2 to 3 parts by weight of $H_2SO_4$ to 1 part by weight of $H_3PO_4$.

3. A method for agglomerating bauxite fines which comprises:

mixing bauxite fines which have been calcined at a temperature within the range of about 600° F. to about 1600° F. to a volatile matter content below 10% with an 80% to 90% acid dosage of a mixture of sulfuric acid and phosphoric acid, said mixture of acids being of 90% to 100% concentration and containing from about 1½ to about 3½ parts by weight of $H_2SO_4$ to 1 part by weight of $H_3PO_4$, forming the mixture into agglomerates, heating said agglomerates at a temperature within the range of about 200° F. to about 400° F. for a time sufficient for said acids to react substantially completely with aluminum in said bauxite fines and, without washing them, calcining the aged agglomerates at a temperature within the range of about 900° F. to about 1800° F. for a time sufficient to eliminate sulfate substantially completely therefrom.

4. A method for agglomerating bauxite fines which comprises:

mixing bauxite fines which have been calcined to a volatile matter content below 1% at a product temperature not to exceed about 1600° F. with a sufficient quantity of a mixture of sulfuric acid and phosphoric acid to permit agglomeration of said fines, said mixture of acids being of 90% to 100% concentration and containing from about 1½ to about 3½ parts by weight of $H_2SO_4$ to 1 part by weight of $H_3PO_4$, forming the mixture into agglomerates, aging the agglomerates out of direct contact with an external aqueous liquid phase, so as to prevent leaching, at an ambient temperature within the range of about 200° F. to about 400° F. and for a time sufficient for said acids to react substantially completely with aluminum in said bauxite fines, and, without washing them, calcining said agglomerates at a product temperature not to exceed about 1800° F. for a time sufficient to eliminate sulfate substantially completely therefrom.

5. The method of claim 4 in which said mixture of acids contains from 2 to 3 parts by weight of $H_2SO_4$ to 1 part by weight of $H_3PO_4$.

6. The method of claim 4 wherein a 80% to 90% acid dosage of said mixture of acids is employed.

7. A method for forming thermally stable attrition-resistant bauxite pellets suitable as a carrier for catalytic material which comprises mixing bauxite fines that have been previously calcined at a temperature within the range of about 1300° F. to about 1500° F. to a volatile matter content below 1% with a sufficient quantity of a mixture of sulfuric acid and phosphoric acid to permit extrusion of said fines while controlling the temperature of the mixture of bauxite fines and mixture of acids so that its temperature does not exceed about 150° F. during mixing, said mixture of acids being of 90% to 100% concentration and containing from about 1½ to about 3½ parts by weight of $H_2SO_4$ to 1 part by weight of $H_3PO_4$, extruding the mixture, heating the extrudate at a temperature within the range of about 200° F. to about 400° F. for a time sufficient for said acids to react substantially completely with aluminum in said bauxite fines and, without washing them, calcining the aged extrudate at a temperature within the range of about 900° F. to about 1800° F. for a time sufficient to eliminate sulfate substantially completely therefrom.

8. A method for agglomerating bauxite fines which comprises:

mixing bauxite fines which have previously been calcined at a temperature within the range of about 1300° F. to about 1500° F. to a volatile matter content below 1% with an 80% to 90% acid dosage of a mixture of sulfuric acid and phosphoric acid, while controlling the temperature of the mixture of bauxite fines and acids so that its temperature does not exceed about 150° F. during mixing, said mixture of acids being of 90% to 100% concentration and containing from 2 to 3 parts by weight of $H_2SO_4$ to 1 part by weight of $H_3PO_4$, extruding the mixture to form pellets, heating the extrudate at a temperature within the range of about 200° F. to about 400° F. for a time sufficient for said acids to react substantially completely with aluminum in said bauxite fines and, without washing them, calcining the aged pellets at a temperature within the range of about 900° F. to about 1800° F. for a time sufficient to eliminate sulfate substantially completely therefrom.

9. Mechanically strong adsorptive agglomerates of bonded activated bauxite fines which maintain their mechanical strength after they have been impregnated with catalytic material and subjected to heat, said agglomerates being prepared by:

mixing bauxite fines which have been calcined at a temperature within the range of about 600° F. to about 1600° F. to a volatile matter content below 10% with a sufficient quantity of a mixture of sulfuric acid and phosphoric acid to permit agglomeration of said fines, said mixture of acids being of 90% to 100% concentration and containing from about 1½ to about 3½ parts by weight of $H_2SO_4$ to 1 part by weight of $H_3PO_4$, forming the mixture into agglomerates, heating said agglomerates at a temperature within the range of about 200° F. to about 400° F. for a time sufficient for said acids to react substantially completely with aluminum in said bauxite fines and, without washing them, calcining the aged agglomerates at a temperature within the range of about 900° F. to about 1800° F. for a time sufficient to eliminate sulfate substantially completely therefrom.

References Cited by the Examiner

UNITED STATES PATENTS

| | | | |
|---|---|---|---|
| 1,482,793 | 2/1924 | Hartmann | 106—65 |
| 2,630,616 | 3/1953 | Robinson | 106—65 X |
| 2,852,401 | 9/1958 | Hansen et al. | 106—65 X |
| 2,966,421 | 12/1960 | Zimmerman et al. | 106—65 X |

FOREIGN PATENTS

| | | |
|---|---|---|
| 1,043,914 | 11/1956 | Germany. |

MAURICE A. BRINDISI, *Primary Examiner.*